T. W. VARLEY.
ELECTRICAL MEASURING INSTRUMENT.
APPLICATION FILED MAR. 3, 1911.
1,199,444.
Patented Sept. 26, 1916.
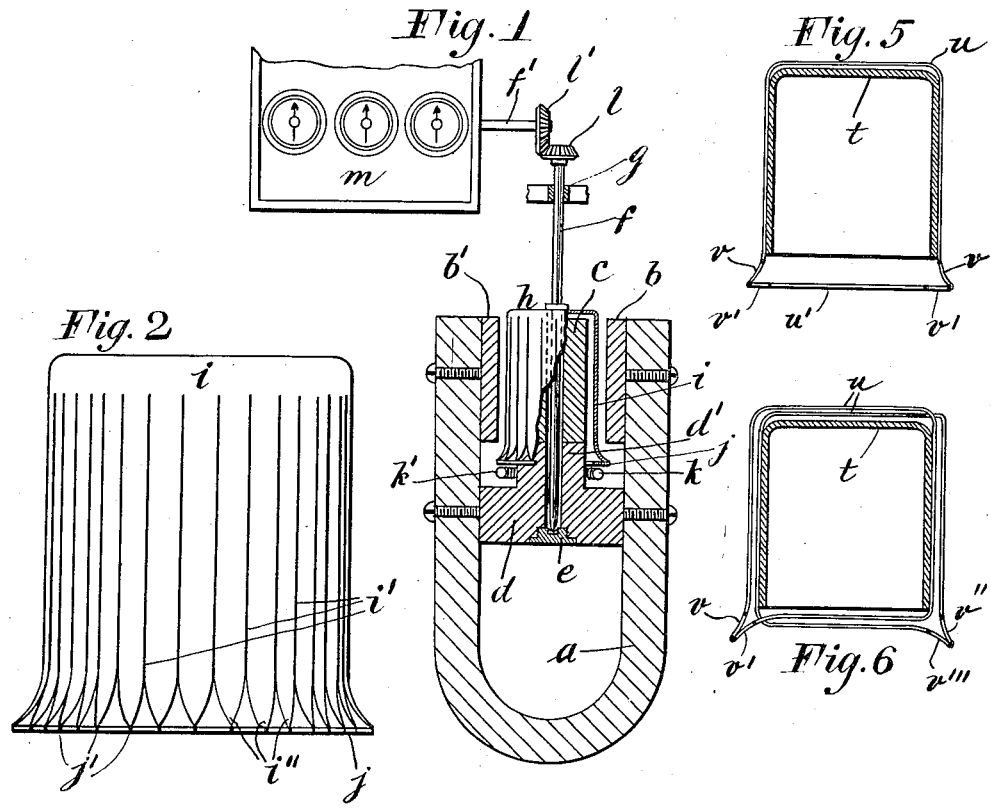
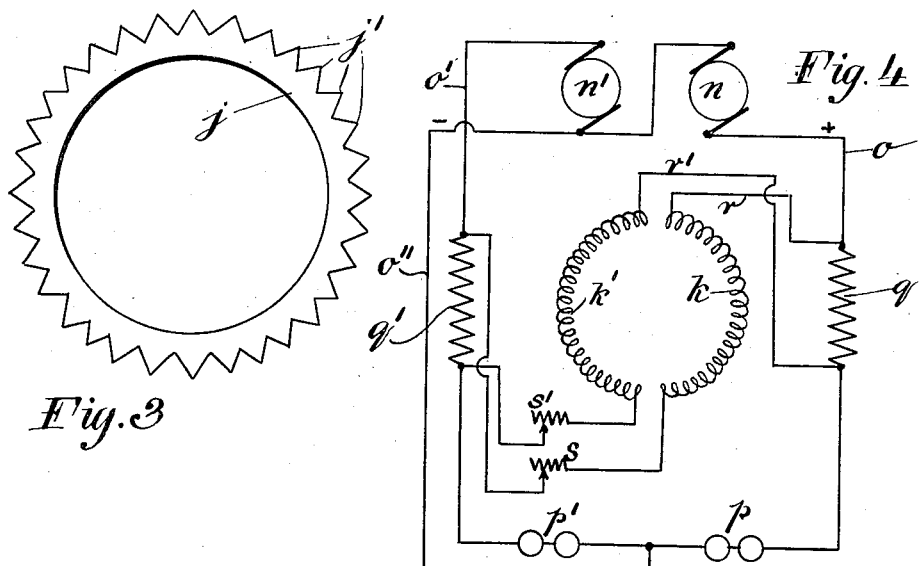
Witnesses:
E. P. La Gay
Francis A. Stanton
Inventor
Thomas W. Varley
By his Attorneys
Kenney, Mastick

UNITED STATES PATENT OFFICE.

THOMAS W. VARLEY, OF NEW YORK, N. Y., ASSIGNOR TO WESTINGHOUSE ELECTRIC & MANUFACTURING COMPANY, A CORPORATION OF PENNSYLVANIA.

ELECTRICAL MEASURING INSTRUMENT.

1,199,444.  Specification of Letters Patent.  Patented Sept. 26, 1916.

Application filed March 3, 1911. Serial No. 611,982.

*To all whom it may concern:*

Be it known that I, THOMAS W. VARLEY, a citizen of the United States, and a resident of the borough of Manhattan, city, county, and State of New York, have invented a new and useful Improvement in Electrical Measuring Instruments, of which the following is a specification.

My invention relates to an improvement in electrical measuring instruments wherein advantage is taken of the electromotive forces generated by a plurality of thermoelectric couples, the electromotive forces causing or tending to cause currents to flow which are instrumental in effecting changes of position of the thermo-electric couples relative to the source of heat. These couples may be connected to windings in such a way that their electromotive forces are added or subtracted or are independent of each other.

In the following I have described, in connection with the accompanying drawings, a means illustrating one way of carrying out my invention, the principles thereof being more fully pointed out hereinafter in the claims.

In the drawings Figure 1 is a front elevation, partly in section and partly diagrammatic, of a structure illustrating one way of carrying out my invention, the structure illustrated being in the form of a direct current watt hour meter. Fig. 2 is a front elevation, on an enlarged scale, of a rotatable thermo-electric element. Fig. 3 is a plan view from beneath looking upward of the element shown in Fig. 2. Fig. 4 is a diagrammatic plan view showing electrical connections for a three wire meter system. Fig. 5 is a sectional view of a modification of the thermo-electric element, showing a supporting cup and one of a set of windings. Fig. 6 is a sectional view of another modification, showing a supporting cup and two sets of windings, one on top of the other.

Similar letters of reference indicate similar parts throughout the several views.

$a$ indicates a suitable magnet, preferably constant, here shown in the form of a permanent magnet, provided with pole pieces $b$, $b'$.

$c$ indicates a core, preferably of soft iron, mounted on a suitable non-magnetic support $d$, in turn supported by the magnet $a$. The non-magnetic support $d$ is shown as circumferentially cut away at the upper side forming an upper projection $d'$, on which the core $c$ rests.

$e$ is a bearing for the shaft $f$, the upper end of which turns in a suitable bearing $g$, supported in any convenient manner.

$h$ indicates an armature in the form of an inverted cup, supported on shaft $f$ and located in the air gap between the poles of the magnet and the core. The armature comprises a cup $i$ of copper, for example, slotted from a point near its top, to the bottom, forming conducting strips, and a ring $j$ of a suitable metal or alloy, constantan, for example. The slots in the cup $i$ are indicated by $i'$ and may be of any desired number. The lower ends of the strips are shown as cut away so as to form points $i''$ at the ends of the strips. The ring $j$ is shown as serrated on its outer periphery, forming teeth or points $j'$ to which the points $i''$ of the cup are connected or joined in any convenient manner, the number of serrations in the ring $j$ preferably corresponding to the number of strips in cup $i$. The metals of the cup $i$ and ring $j$ are selected so as to have differences of electromotive force set up in them by the application of heat at the points of junction of the two metals, each such junction thereby constituting a thermo-electric couple.

$k$, $k'$ indicate heating elements, here shown as coils, adapted to be heated by the passage of current through them, and to thus heat the junctions constituting the thermo-electric couples.

$l$ indicates a gear at the upper end of shaft $f$ meshing with gear $l'$ on shaft $f'$, the latter actuating suitable mechanism $m$ of any desired type.

In Fig. 4, $n$, $n'$ indicate suitable sources of electricity, here shown as direct current generators, connected as in a three wire system, $o$ indicating the positive lead, $o'$ the negative and $o''$ the neutral. $p$ and $p'$ indicate the load. $q$ and $q'$ indicate suitable load shunt resistances. $r$ indicates the potential lead from one side of one load shunt resistance, as $q$, through heating coil $k$ and adjustable resistance $s$, to the corresponding side of the other load shunt resistance, as $q'$, and $r'$ indicates the potential lead from the other side of the same load shunt resistance, as $q$, through heating coil $k'$ and adjustable resistance $s'$, to the corresponding side of the other load shunt resistance, as $q'$.

In Fig. 5, $t$ indicates a cup of any suitable material, such as paper. $u$ and $u'$ indicate conducting wires, of any suitable material, such as copper. $v$ and $v'$ indicate thermo-electric couples, such as bismuth and antimony, for example. Any desirable number of circuits may be utilized.

In Fig. 6 the couples $v$, $v'$, and $v''$, $v'''$ are in independent circuits, otherwise the description is the same as for Fig. 5.

The operation of the device illustrated in Figs. 1 to 4 inclusive, is as follows: The thermo-electric junctions, facing one pole of the magnet, are heated to a different temperature from those facing the other pole. As the thermo electromotive force is a function of the heat, the two sets of junctions will have a resultant electromotive force, sending current up one side of the cup $i$ and down the other. These currents passing up on one side and down on the opposite side of the cup through the magnetic field, produce a torque of rotation on the cup. As the cup rotates the junctions of the thermo-electric couples on one side pass successively out of the field of one temperature, say the higher temperature, into the field of a different temperature, say a lower temperature, while the junctions of the thermo-electric couples on the other side pass successively out of the field of lower temperature into the field of higher temperature, the junctions passing through the varying fields of temperature without causing any appreciable variation in the torque upon the cup. As the cup rotates a counter electromotive force is set up in the two sides of the cup tending to stop its rotation, the final speed of the cup being such that the thermo electromotive forces less the counter electromotive forces give net electromotive forces sufficient to cause currents to flow to overcome the friction of rotation. The heat from the coils $k$ and $k'$ varies as the square of the current in the coils. One end of coil $k$ for instance, and one end of coil $k'$ are connected through potential leads $r$ and $r'$ respectively, to opposite sides of load shunt resistance $q$, which is in series with the load, and the other ends of coils $k$ and $k'$ are connected, through adjustable resistances $s$ and $s'$ respectively, to the opposite sides of load shunt resistance $q'$ as shown. With equal currents in the coils $k$ and $k'$, equal heat effects are produced on the junctions of the thermo-electric couples, this constituting the condition of no load. For example, assume normal voltage, and no load. Assume further that the $I^2R$ loss in coils $k$ and $k'$ is equal. Each coil will then give off the same heat and hence there will be no tendency toward rotation of the cup. With load current flowing through loads $p$ and $p'$, a drop takes place in the load shunts, which changes the amount of current passing through coil $k'$, resulting in a difference of temperature which varies substantially in accordance with the watts of the load. For example, assume that this load causes a drop of one volt in each of the load shunts; the voltage on the line side of the load shunts $q$ and $q'$ remains constant, whereas the voltage on the load side of the load shunts $q$ and $q'$ falls two volts, causing a difference in the currents flowing through heat coils $k$ and $k'$. The heating effects on each coil varying as the square of the voltages and the difference in temperatures varying as the difference in the squares of the voltages, there is therefore a difference of electromotive force set up in the cup which causes or tends to cause a rotation of the cup. In other words, the net difference in temperature is a function of the product of the line voltage times the amperes of the load or the effort of turning varies substantially in accordance with the watts of the load. Again, assume the load to be constant and raise the voltage. The heat from coils $k$ and $k'$ will rise proportionately to the square of the change of voltage but the difference of heat between the coils $k$ and $k'$ will rise directly.

The system illustrated is a balanced three wire system. It is obvious that, in an unbalanced three wire system, even to the extent of the load being all on one side of the system, the action of the instrument is similar in all respects to that described.

The apparatus illustrated is a watt hour meter because the speed of rotation of the cup is a function of two things, a constant frictional resistance and a counter electromotive force caused by the rotation of the cup and varying with the speed. Ignoring the frictional effect the speed will then be a function of the load and the instrument becomes a watt hour meter.

It will be understood that, if the cup is prevented from rotating by a spring, as in an indicating instrument for example, the cup will rotate until the torque of rotation is balanced by the spring.

The modifications shown in Figs. 5 and 6 may be substituted for the cup $i$, their action being similar in all respects to the action of cup $i$. It is obvious that if the metals of one half of the couples should be reversed, so that on one side the antimony will be above and on the other side the bismuth will be above, the effects of the electromotive forces in the couples will be added, the instrument in this case being used as an indicating voltmeter or ammeter.

While I have described the apparatus in connection with a direct current, it is obvious that it may as well be used in connection with an alternating current and while I have described it as applied to a watt hour meter it is obvious that the principles may as well be applied in connection with other electrical measuring instruments. It is further obvious that in the system illustrated two additional heat coils may be used, one set of coils taking their potential from the neutral, to one load shunt, as $q$, and the other set from the neutral to the opposite load shunt, as $q'$, or that where but two coils are used, they may be joined together to a common adjustable resistance, as in connection with a two wire meter. None of the details shown, however, are of the essence of the invention and I do not restrict myself, further than the scope of the appended claims demand, to any of the details herein shown and described.

What I claim and desire to secure by United States Letters Patent is:

1. In a measuring instrument for an electric circuit, the combination with a thermo-electric element, of means for heating said element in accordance with the potential of the circuit, and a second means for heating the said element, said second means being dependent upon the current that traverses the circuit, said heating means being so disposed as to be opposed in their action upon the thermo-electric element.

2. A measuring instrument for an electric circuit comprising a thermo-electric armature, means for heating the armature in accordance with the potential of the circuit, a second means for heating the said armature, said second means being dependent upon the current that traverses the said circuit, and magnetic means for coöperating with the thermo-electrically-induced current in the armature for causing its rotation.

3. In an electrical measuring instrument, a plurality of thermo-electric couples, a plurality of means respectively for subjecting some of said couples successively to a temperature different from the temperature to which others are subjected, said means being opposed in their action, and means permitting the electromotive forces thus set up to give said couples a tendency to rotate.

4. In an electrical measuring instrument, a plurality of thermo-electric couples, a plurality of means respectively for subjecting a portion of said couples successively to a temperature different from the temperature to which other portions are subjected, said means being opposed in their action, and means permitting the electromotive forces thus set up to give a continuous rotational effect to said couples.

5. In an electrical measuring instrument, a plurality of thermo-electric couples, a plurality of means respectively for subjecting one half of said couples to a temperature different from that to which the other half is subjected, said means for producing a difference in temperature being opposed in their action, and means permitting the electromotive forces thus set up to give a rotational effect to said couples.

6. An electrical measuring instrument comprising a magnet, an armature between the poles thereof, and thermo-electric means associated with the armature and arranged to produce opposed electromotive forces in the parts of the armature that are respectively adjacent to opposite poles of the magnet.

7. An electrical measuring instrument comprising an armature, and a plurality of thermo-electric means associated with the armature and arranged to produce opposed electromotive forces in different parts thereof.

8. An electrical measuring instrument comprising a magnet, an armature winding between the poles thereof, thermo-electric couples associated respectively with the conductors of the armature winding, and heating devices respectively adjacent to thermo couples associated with different parts of the armature winding.

9. An electrical measuring instrument comprising an armature winding, thermo-electric couples respectively associated with the conductors of the said winding, and heating devices respectively adjacent to thermo couples that are associated with different conductors of the armature winding.

10. An electrical measuring instrument comprising a plurality of thermo-electric couples, heating devices respectively adjacent to different couples, and means whereby the couples are actuated as a result of the electromotive forces set up thereby.

11. An electrical measuring instrument comprising an armature winding, thermo-electric couples respectively associated with conductors thereof and arranged to produce electromotive forces therein, means for applying heat of two different thermal values, the difference in temperature of which is substantially proportional to the energy to be measured and magnetic means whereby the armature is actuated as a result of the electromotive forces set up therein.

12. An electrical measuring instrument comprising a resistor, a plurality of thermo-electric couples, heating devices for the couples respectively connected to opposite ends of the resistor, and means whereby the couples are actuated as a result of the electromotive forces set up thereby.

13. An electrical measuring instrument comprising a plurality of thermo electric couples, means for applying heat of two different thermal values the difference in temperature of which is substantially proportional to the watts traversing the meter, and means whereby the couples are actuated as a result of the electromotive forces set up thereby due to the said differences of temperature.

14. The combination with an electrical circuit and a resistor in series therewith, of a plurality of thermo-electric couples, two heating conductors adjacent thereto that are connected in multiple to said circuit and respectively to opposite ends of the resistor, and means whereby the couples are actuated as a result of the electromotive forces set up thereby.

15. An electrical measuring instrument comprising a plurality of thermo-electric couples, means for applying heat of two different thermal values thereto proportional to the differences of the squares of two electromotive forces that are dependent in value upon the potential of and the amount of current traversing the circuit in connection with which the meter is employed, and means whereby the couples are actuated as a result of the said differences of temperature.

16. The combination with an electrical circuit and a resistor in series therewith, of a plurality of thermo-electric couples, means for applying heat of two different thermal values to the couples proportional to the differences of the squares of electromotive forces that are dependent in value upon the potential of the circuit and amount of current traversing the said resistor, and means whereby the couples are actuated as a result of the said differences of temperature.

17. In an electrical measuring instrument, the combination with a thermo-electric armature and a permanent magnet therefor, of a heating device disposed in close proximity to each pole of the said magnet and adapted to cause the armature to develop a torque substantially proportional to the difference in the energy consumed by the heating devices.

18. An electrical measuring instrument comprising a resistor, a plurality of thermo-electric couples, two heating devices for the couples respectively connected to opposite ends of the resistor, and a permanent magnet for actuating the couples as a result of the electromotive forces set up therein by the two heating devices.

In testimony whereof I have signed this specification in the presence of two subscribing witnesses.

THOMAS W. VARLEY.

Witnesses:
SEABURY C. MASTICK,
K. G. LEARD.